Feb. 28, 1956   T. F. PETERSON   2,736,398
GUY WIRE CONSTRUCTION
Filed Sept. 14, 1949   2 Sheets-Sheet 2
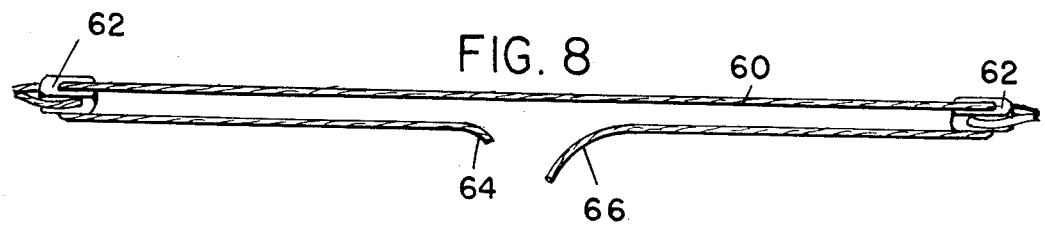
FIG. 8
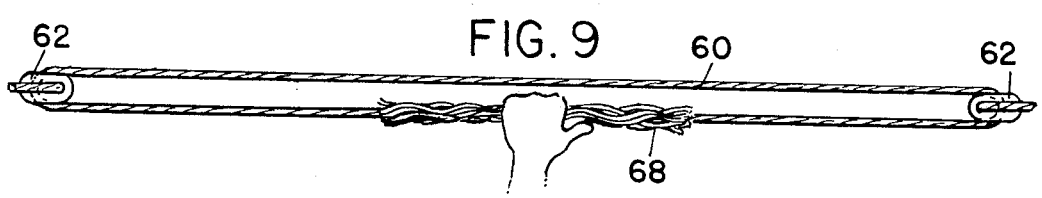
FIG. 9
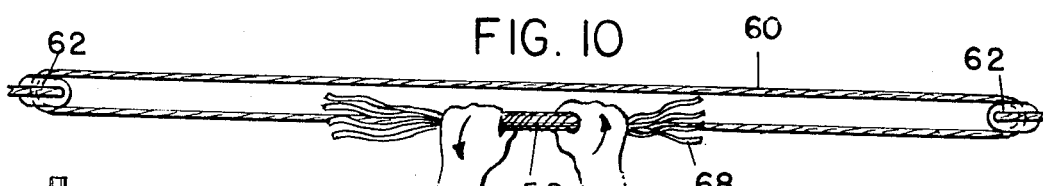
FIG. 10
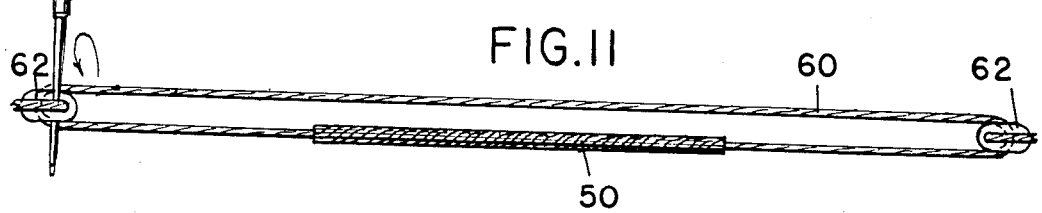
FIG. 11
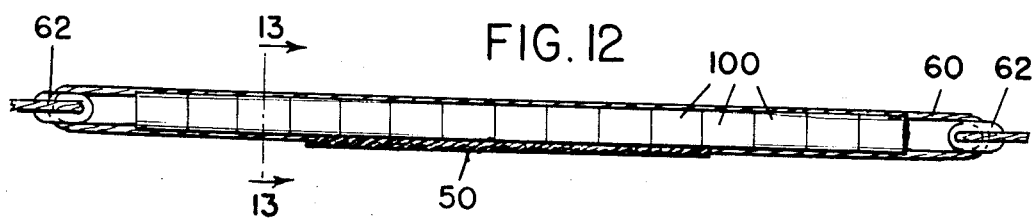
FIG. 12
FIG. 14
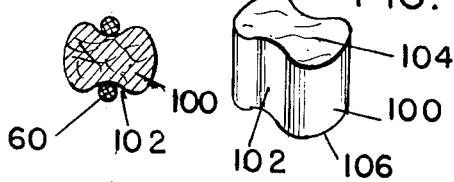
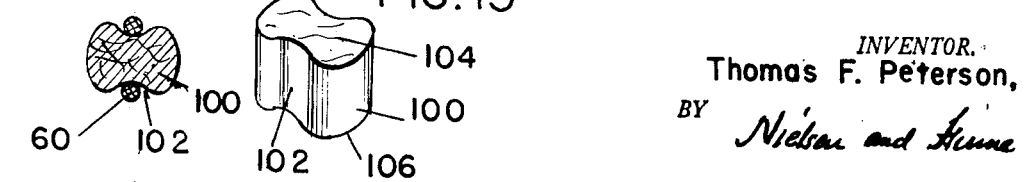
FIG 13   FIG. 15
INVENTOR.
Thomas F. Peterson,
BY Nielsen and Hunne
Attorneys

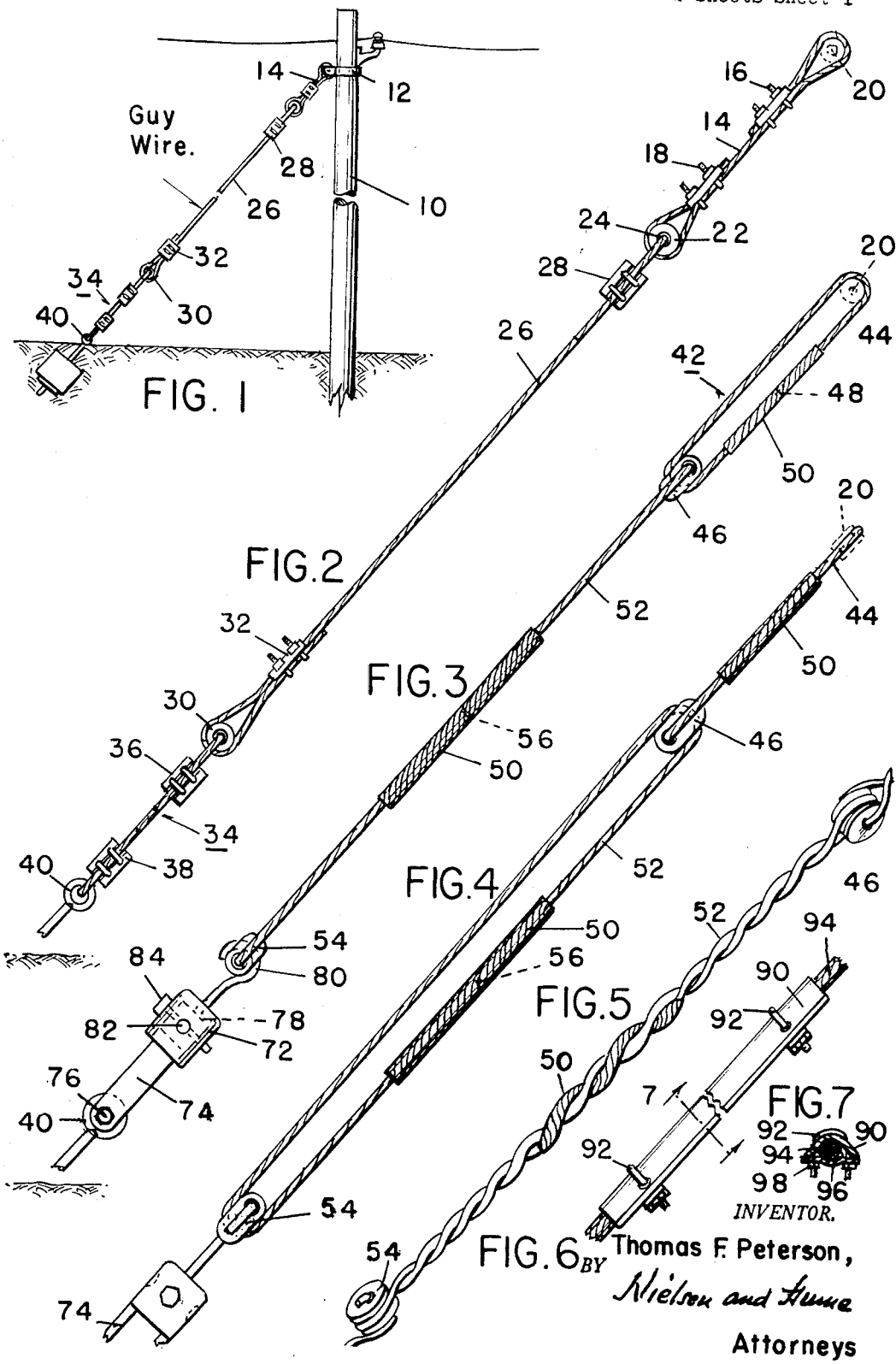

United States Patent Office 2,736,398
Patented Feb. 28, 1956

2,736,398

GUY WIRE CONSTRUCTION

Thomas F. Peterson, Cleveland, Ohio, assignor to Preformed Line Products Company, a corporation of Ohio Application September 14, 1949, Serial No. 115,672

7 Claims. (Cl. 189—31.5)

This invention relates to guy wires or flexible stays by means of which supporting structures similar to telegraph poles, radio and power transmission towers, etc., are supported or braced by a tension member extended in opposition to the working load of the support to a point of anchorage on the ground, between adjacent poles, or other structures.

The invention is especially concerned with the provision of a simplified guy wire or stay construction which eliminates many of the parts and fittings characteristic of devices of this kind currently in use, and which greatly simplifies the time and labor required to effect the installation. Specifically, the invention utilizes the characteristics of helically preformed armor rods or reinforcements to effect a strong frictional splice between butted ends of a wire or cable without sacrificing flexibility. When applied to splice such adjacent ends, the helically preformed reinforcements resist axial displacement to the extent that the strand, rope or cable will fail at portions beyond the splice upon imposition of tensile loads exceeding the ultimate strength thereof without affecting the splice itself.

The helically preformed armor rods or reinforcements with which the present invention is concerned are similar to those set forth in my prior Patent No. 2,275,019 and in my co-pending applications filed June 23, 1945, Serial No. 601,245, now Patent No. 2,258,521; filed September 20, 1946, Serial No. 698,312; and January 14, 1948, Serial No. 2,200.

The invention will be better understood by reference to the accompanying drawings in which—

Fig. 1 is a schematic fragmentary side elevational view of an ordinary electrical transmission line pole having a guy wire rigged thereupon according to conventional practices.

Fig. 2 is an enlarged elevational view of the guy wire construction shown in Fig. 1.

Fig. 3 is a corresponding view of a guy wire construction made in accordance with the present invention.

Fig. 4 is an elevational view of the device shown in Fig. 3 viewed at an angle of 90° with relation thereto.

Fig. 5 represents a guy wire formed in the manner of Figs. 3 and 4 but twisted about its longitudinal axis to remove slack and to develop tension in the guy wire after the manner of the present invention.

Fig. 6 is a fragmentary side elevational view of the form of guard employed on guy wires currently in use.

Fig. 7 is a sectional view taken along the lines 7—7 of Fig. 6.

Figs. 8 to 11, inclusive, schematically illustrate the steps involved in the assembly of a guy wire construction made in accordance with the present invention.

Fig. 12 illustrates a new form of guard for use in connection with the present invention, the elements of which guard are similar to those shown in Fig. 15.

Fig. 13 is a sectional view taken along line 13—13 of Fig. 12.

Fig. 14 is a schematic representation showing the effect of twist upon the construction of Fig. 12.

Fig. 15 is a perspective view of a single guard element, a plurality of which are utilized in the manner shown in Figs. 12 and 14.

Referring now more particularly to the drawings, and especially with reference to Figs. 1 and 2, in accordance with conventional usage, the structure 10 to be supported is provided with a pole fastening 12 to which a bridle 14 composed of a relatively short length of strand is secured by doubling the ends of the strand back upon itself and making them fast in this position by means of clamps 16 and 18. Of the two bights thus formed, one embraces a fitting 20 on the pole fastening 12, while the other embraces a conventional type of insulator 22 which has a bearing portion 24 in which the principal guy strand 26 is engaged. The end of the guy strand is doubled back upon itself through the insulator and fastened in this position by a clamp 28. At its opposite end, the strand 26 is provided with a corresponding construction involving the insulator 30 within which the adjacent end of the strand is disposed, doubled back upon itself, and secured in this position by the clamp 32. A bridle construction indicated generally at 34 is formed in the manner similar to that already described in connection with the bridle 14. A pair of clamps 36 and 38 secure the ends of the bridle strand in engagement with the insulator 30 at one end, and with the ground anchor fitting 40 at the other end so as to complete the assembly. In some installations, the bridle 34 is replaced by a turnbuckle for the purpose of selectively applying the requisite degree of tension. In other instances, the tension is secured manually by pulling the bight portions of the guy strand or bridles a sufficient distance back upon their own length with the aid of pulling tools adapted to this purpose. When the tension is sufficient, the clamps are applied and the construction is complete.

These conventional types of stays employ three separate lengths of strand, six clamps and associated parts, at least two insulators, and, in some instances, a turnbuckle, in addition to the usual pole fastenings and ground anchor arrangements. In the ensuing figures of the drawings, there is shown the simplified form of guy wires or stays made in accordance with the present invention which greatly reduces the number of parts and fittings required and affords a simplification of technique in the installation of the stay so as greatly to reduce the time and labor required for this purpose.

In accordance with one form of the invention, a bridle 42, which may be made in accordance with the conventional practice discussed in connection with Fig. 2, but which preferably is made in accordance with the improved technique hereof, is provided by a short length of strand 44 which extends through a bearing in an insulator 46 and around the pole fastening 20 in an endless loop so that its ends are butted together as is shown at 48 in Fig. 3. A set of helically preformed reinforcements 50 is disposed around the butted ends so as to form a tubular splice which extends for a substantial distance upon each side of the butted ends of the strand. These are applied as will be more fully described hereinafter, in ways similar to those set forth in my prior applications above identified.

To the same extent, the principal guy strand 52 is strung between the insulator 46 and a lower insulator 54 and is brought around to form an endless loop wherein its ends are brought into contiguity, or substantially so, as at the line 56 in Figs. 3 and 4. Another set of helically preformed reinforcements 58 are applied to effect a splice in the endless loop of strand as shown in Figs. 3 and 4. In most instances, the helically preformed reinforcements are preferably composed of hard drawn wire of the same or somewhat larger size than the wires comprising the components of the strands themselves. These hard drawn wires are preformed to an internal helical diameter that is equal to approximately 85 per cent of the overall outside diameter of the strands with which they are to be associated. This assures that the helically preformed wires, when twisted in place around the strand to bridge the joint formed by its butted ends, tightly hug and firmly grip the strand so as positively to resist axial displacements between the assembled elements. Each preformed helix is made to the same pitch and lay as its fellows so as to conform in mutual association therewith, and, furthermore, are formed to an angle of lay which is equal to or less than the angle of lay of the strands to which they are applied so as to effect maximum linear engagement with the latter, thus, to develop the highest modulus of friction. (See my co-pending application filed April 27, 1948, Serial No. 23,579 now Patent No. 2,609,653.)

The length of the helically preformed splices should be sufficient in extent upon each side of the joint of the strand to give a frictional resistance to pull equally to or greater than the breaking strength of the strand of association. Abrasive grit or other suitable substances may be interposed between the helical splices and the strands per se in order to increase the frictional resistance in augmentation of the holding power of the splice.

Since both the strands and the helical splices are formed of helical components, they are necessarily flexible and permit the endless loops comprising the bridle 42 and the guy strand 52 to be twisted about the longitudinal axis of the assembly to attain a twisted arrangement similar to that shown in Fig. 5 in which, by virtue of the longitudinal take-up incident to the twisted position, a suitable tension is imposed on the assembly to any degree desired. As illustrated, the twist imposed to the looped strand is of the same hand as that of the components of the strand and helically preformed splice, since this affords the tightest twist and greatest longitudinal take-up with the least number of turns. However, a twist of the opposite hand to that of the lay of the strand and splice can also be used, with the result that a looser twist of less tension for the same number of turns is developed, or the same tension and as tight a twist for a greater number turns. This is due, of course, to the tendency to twist (tighten) or untwist (loosen) the components of the strand and splice, as the case may be, depending upon the direction of twisting.

In Figs. 8 to 11, inclusive, there is illustrated one method for forming the guy wire assembly in accordance with this invention. A strand 60 of requisite length is applied between supporting insulators 62 in the manner shown so that its ends 64 and 66 may be drawn into abutting relation, or substantially so. In Fig. 9, the ends are assumed to be in abutting relation, and a set of helically preformed armor rods or reinforcements 68 are represented as being held in surrounding parallel relation thereto by hand preparatory to being installed. In Fig. 10 a pair of hands are represented to be applying the helically preformed elements 68 to constitute a closed tube 50 by twisting the elements from a point adjacent their middle outwardly toward their ends in opposite directions as shown by the arrows. This might be likened to a wringing action.

In Fig. 11, the strand 60 is shown joined by the splice 50 to constitute an endless loop between the insulators 62. The assembly of Fig. 11 may be twisted as shown in Fig. 5 by the insertion of a tool 70, which acts as a suitable lever to twist the assembly about its longitudinal axis an amount sufficient to develop the tension desired. This is made possible by the association of a swivel joint interposed between the ground anchor fitting and the principal guy strand. One such arrangement has been shown in a schematic manner in Figs. 3 and 4, but it will be understood that this particular swivel construction may take any suitable form for the accomplishment of the purpose intended, of which the one illustrated is but exemplary. As shown, a socket 72, is provided with longitudinally extending clevis arms 74 which extend from the relative left and right sides of the socket to a position of engagement with the guard anchor 40. The lower or outermost ends of the clevis arms 74 are provided with bores for alignment with the ground anchor fitting 40 in such a way that a bolt 76 may be passed through the bores in the clevis arms so as to engage the ground anchor fitting.

Within the socket 72, sufficiently large so as to resist displacement through the end of the socket, is a revoluble shank 78 to which a hook or other tension member 80 is rigidly secured. The shank 78 is provided with a plurality of radial bores which pass through it, and which effect registration with openings 82 in the socket of the swivel. A pin 84 is adapted to pass through the socket openings 82, and through the radial bores of the revoluble shank 78, so as to prevent relative revolutionary motion therebetween, when the pin is in position. By withdrawing the pin 84, and by applying a lever similar to the tool 70 shown in Fig. 11, the swivel may be revolved to twist the loop strand in a manner corresponding to that illustrated in Fig. 5. When the desired degree of tension has been developed, the pin 84 is pushed into place through the socket openings 82 and the radial bores in the revoluble shank 78 to maintain the twist.

In accordance with conventional practices, guy wires and stays of the type here under discussion present a very slight cross-sectional mass in obstruction of any space where they are disposed. Frequently, these strands are under considerable tension and thus are relatively immobile. As such, they are seen with difficulty by those unfamiliar with their presence, and are capable of inflicting considerable damage if they are accidentally struck or collided with. In order to increase the visibility of such elements, and to render the force of accidental impact less dangerous, there have in the past been applied various types of shields, or guards, a common form of which is illustrated in Figs. 6 and 7. Ordinarily, this takes the form of an elongated rectangular piece of metal which is bent in a shallow U or L shape similar to that represented by 90 in these figures. Clamps 92, usually in the form of U shape members, are passed through holes so as to encompass the guy strand 94, upon the far side of which they come into engagement with a yoke 96 to which they are secured by nuts 98. This type of guard, although equally applicable to the construction of the present invention, is not desired in view of its cost, its unwieldiness in size and shape, and because of the special fittings, labor and time required in its installation.

Accordingly, an improved form of guard has been devised for use with the present invention to which its construction is peculiarly adapted. In Fig. 12 there is shown an assembly corresponding to that already discussed in connection with Fig. 11, in which a guy strand 60 is disposed between insulators or other terminal members 62 to which it is spliced by the helical elements 50. Within the bight thus formed, there is disposed a plurality of metal, wooden, or plastic elements 100 similar to that shown in Fig. 15. These elements comprise substantially rounded blocks having laterally opposed grooves 102 upon opposite sides thereof, and squared ends 104 and 106 in opposed relation constituting the included surfaces. The grooves 102 form bearings in which the strand is accommodated whereby the blocks are held in assembled relationship between the opposed runs of the strand 60, as shown in Figs. 12 and 13. By this arrangement, it becomes possible still to twist the guy strand in order to effect the tightening described in connection with Fig. 5 since the elements 100 are separate and apart from each other, held together merely by frictional engagement with the strands 60. When so twisted, they may be disposed in a relatively helical pattern similar to that shown in Fig. 14. The tool or lever 70, as shown in Fig. 11, is applied to the swivel in the case of Fig. 12 in the same manner as that already described, and the requisite twist is imparted to the assembly to effect an ultimate orientation of the several parts as is schematically represented in Fig. 14, wherein the staying components are under the requisite tension.

The guard elements 100 are rounded in contour and are thus effective in diminishing the damaging affects of accidental collision with the guard wire when taut. They are of substantial size so as greatly to augment the visibility of the assembly, even under the conditions of relative obscurity. They also serve as filler blocks by which the amount of twisting necessary to arrive at a given tension of line is greatly minimized. Thus do they serve to implement and expedite the entire operation of installation.

It is obvious that, instead of the individual elements, a suitable rigid, unitary elongated member, appropriately shaped, could be inserted within the bight of the strand 60 in an arrangement similar to that shown in Fig. 12. Such a device would not permit the strands to assume a helical disposition between the points of support except at those portions extending beyond the filler piece between the extremities of the latter and the insulators 62, or other supports.

It will be apparent to all familiar with the field of this invention that many changes may be made to the details of the constructions herein set forth without avoiding the inventive principles disclosed. Thus, the application of the spliced loop form of guy strand is not dependent upon any particular form of bridles, suspensions, anchorages, or other detailed fittings. The insulators may be omitted, as would be done in non-electrical installations, of which the mast stays, shrouds and standing rigging of a boat or ship are examples. The principles may be applied to dead-ending any types of lines, and in effecting electrical connections where this is desired. In the latter usage, insulators would give way to conducting or semi-conducting connectors which would serve both as a bight support and as an electrical union. Therefore, no such unessential limitation is intended from the details necessitated herein for purposes of descriptive completeness and example.

I claim:

1. A tension brace construction in which a principal load-bearing member comprises a flexible loop formed of strand having its opposite ends brought together to form a joint, said joint comprising helically preformed splicing elements surrounding each end of said strand in gripping relation therewith and extending along the strand in each direction from said ends for a substantial distance to splice said ends together, said loop being twisted to wrap said strand and splicing elements about each other along the major axis of load.

2. A tension brace construction having a principal tension member in the form of an elongated looped strand defining opposed bight portions, said bight portions accommodating connecting bearings to terminal supports, a guard element disposed within said elongated loop of strand and retained therein by a twist in said loop, said guard element substantially filling said loop between said bight portions.

3. The invention of claim 2, in which the guard element is comprised of a plurality of individual components of mutually conforming shape having means for accommodating opposed portions of said looped strand.

4. A tension brace comprised of a looped tension member extended in load-bearing relation between terminal members, said tension member being a helically laid strand having its ends brought together to form a joint, said joint being made of a plurality of helically preformed elements of conforming pitch and lay having an internal helical diameter slightly less than the external diameter of said strand, and an angle of pitch not exceeding that of said strand, and being of the same hand as the latter, each of said elements being wrapped around said strand in a gripping relation thereto and extending therealong for a substantial axial extent of strand at each side of said joint.

5. A tension brace construction in which a principal load-bearing member comprises a flexible loop formed of a twisted multi-wire strand having its ends brought together to form a joint, said joint comprising helically-preformed splicing elements substantially conforming in pitch angle and length, and hand of lay, with the lay of the wires in said strand, said splicing elements being wrapped about and embracing said strand for a substantial distance along its length at each side of said joint, said loop being twisted to wrap said strand and splicing elements about each other along the major axis of load.

6. The invention of claim 5, in which the twist imparted to said loop is in the same direction as that comprising said strand and splicing elements.

7. A tension brace comprised of a linear body having its ends brought into abutment to constitute a loop, the ends of said body being held together to form a joint by a plurality of helically-preformed splicing elements, the internal diameter of which is slightly less than the overall diameter of said body, and the pitch length of which is equal to several times the diameter of said body, said elements being wrapped tightly about and embracing said body across the joint formed by its butted ends to hold them together, said body being twisted about itself thereby wrapping the opposite sides of the loop including the helically-preformed splicing elements into helically-twisted relationship with each other, the helical twist of said loop being of the same hand as the helical set of said splicing elements.

References Cited in the file of this patent

UNITED STATES PATENTS

| | | |
|---|---|---|
| 188,442 | Tobin | Mar. 13, 1877 |
| 189,480 | Markham | Apr. 10, 1877 |
| 337,513 | Moxham | Mar. 9, 1886 |
| 440,490 | Mitchell | Nov. 11, 1890 |
| 703,305 | Rodecker | June 24, 1902 |
| 861,543 | Shafer | July 30, 1907 |
| 893,555 | Sullivan | July 14, 1908 |
| 1,552,485 | Hughes | Sept. 8, 1925 |
| 1,714,253 | Varney | May 21, 1929 |
| 2,001,893 | Seelye | May 21, 1935 |
| 2,083,369 | Greene | June 8, 1937 |
| 2,128,030 | Kaleno | Aug. 23, 1938 |
| 2,210,587 | Klein et al. | Aug. 6, 1940 |
| 2,275,019 | Peterson | Mar. 3, 1942 |
| 2,414,136 | Bodendieck | Jan. 14, 1947 |
| 2,587,521 | Peterson | Feb. 26, 1952 |
| 2,609,653 | Peterson | Sept. 9, 1952 |

OTHER REFERENCES

P. F. T. Preformed Armor Rods and Multiple Wire Ties, by American Steel and Wire Corporation.